(12) United States Patent
Ozawa et al.

(10) Patent No.: US 7,483,582 B2
(45) Date of Patent: Jan. 27, 2009

(54) JPEG2000 CODING AND/OR DECODING APPARATUS AND METHOD

(75) Inventors: Kaitaku Ozawa, Amagasaki (JP); Kenichi Takahashi, Sennan-gun (JP); Munehiro Nakatani, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 648 days.

(21) Appl. No.: 10/807,390

(22) Filed: Mar. 24, 2004

(65) Prior Publication Data

US 2004/0190784 A1    Sep. 30, 2004

(30) Foreign Application Priority Data

Mar. 27, 2003 (JP) ............................ P2003-087926

(51) Int. Cl.
  *G06K 9/00* (2006.01)
  *G06K 9/36* (2006.01)
  *G06K 9/46* (2006.01)
  *H04N 1/00* (2006.01)
  *H04N 1/40* (2006.01)
  *H04N 7/12* (2006.01)
  *H04N 11/02* (2006.01)
  *H04N 11/04* (2006.01)
  *H04B 1/66* (2006.01)

(52) U.S. Cl. ................. 382/240; 382/166; 382/233; 358/426.12; 358/462; 375/240.19

(58) Field of Classification Search ................. 382/166, 382/176, 182, 232, 233, 240, 292, 299; 358/426.12, 358/462; 375/240.19, 240.29; 708/203
See application file for complete search history.

(56) References Cited

U.S. PATENT DOCUMENTS 6,043,802 A * 3/2000 Gormish ................... 345/596

(Continued)

FOREIGN PATENT DOCUMENTS

JP    11-066196    3/1999

(Continued)

OTHER PUBLICATIONS

ISO/IEC 15444-1 (JPEG 2000, Part 1: Core Coding System), pp. 176 and 180.*

(Continued)

*Primary Examiner*—Yubin Hung
(74) *Attorney, Agent, or Firm*—Buchanan Ingersoll & Rooney PC

(57) ABSTRACT

On JPEG2000 coding apparatus, the coding process is performed by discriminating an area defined by each object contained in image data and specifying type of the object, performing character recognition processing on the area discriminated as that containing a character to produce a text data and producing an XML data corresponding to said text data, adding an XML box that can store a specific data into a bit stream constructing said JPEG2000 file so as to be positioned in back of a predetermined level of wavelet decomposition and causing said XML box to store said XML data. On the other hand, on JPEG2000 decoding apparatus, the decoding process is performed by causing user to select whether to read an XML box added into a bit stream of JPEG2000 file in the middle of JPEG2000 decoding process, and processing the XML data stored in the XML box to acquire a text data.

10 Claims, 13 Drawing Sheets

U.S. PATENT DOCUMENTS

| | | | |
|---|---|---|---|
| 7,079,712 B1 * | 7/2006 | Silverbrook et al. | 382/312 |
| 2001/0028404 A1 * | 10/2001 | Fukuhara et al. | 348/384.1 |
| 2003/0091333 A1 * | 5/2003 | Kotani et al. | 386/69 |
| 2003/0113027 A1 * | 6/2003 | Chan et al. | 382/240 |
| 2004/0146199 A1 * | 7/2004 | Berkner et al. | 382/176 |
| 2006/0170955 A1 * | 8/2006 | Gormish | 358/1.15 |

FOREIGN PATENT DOCUMENTS

| | | |
|---|---|---|
| JP | 2000-251061 | 9/2000 |
| JP | 2001-218208 | 8/2001 |
| JP | 2002-251352 | 8/2002 |

OTHER PUBLICATIONS

Houchin J.S. et al. ("JPEG 2000 file format: An imaging architecture for today and tomorrow," SPIE vol. 4115 (2000), pp. 455-463.*

* cited by examiner

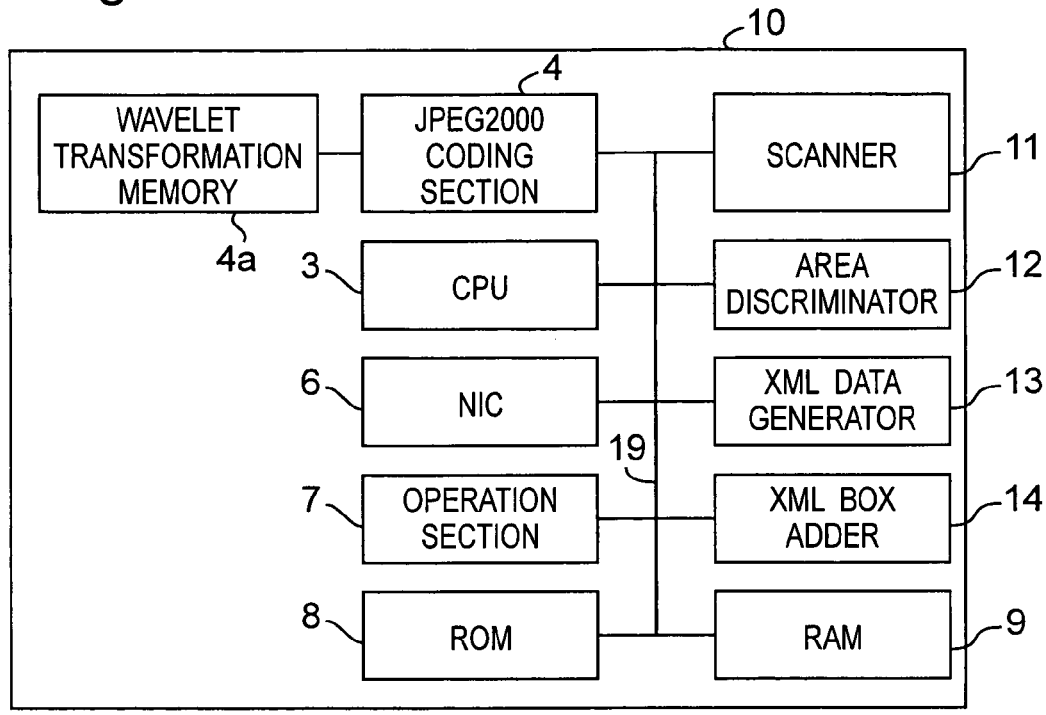
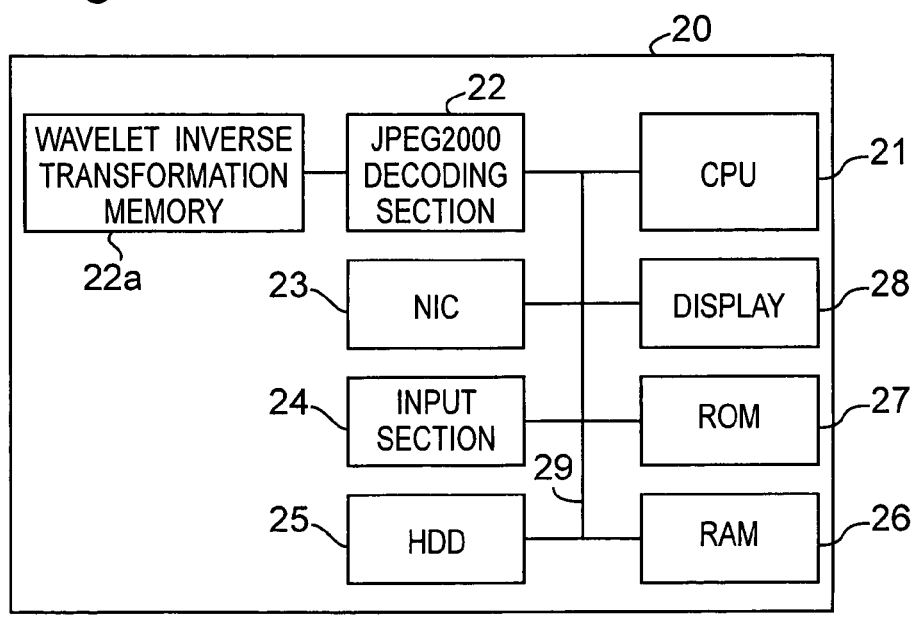

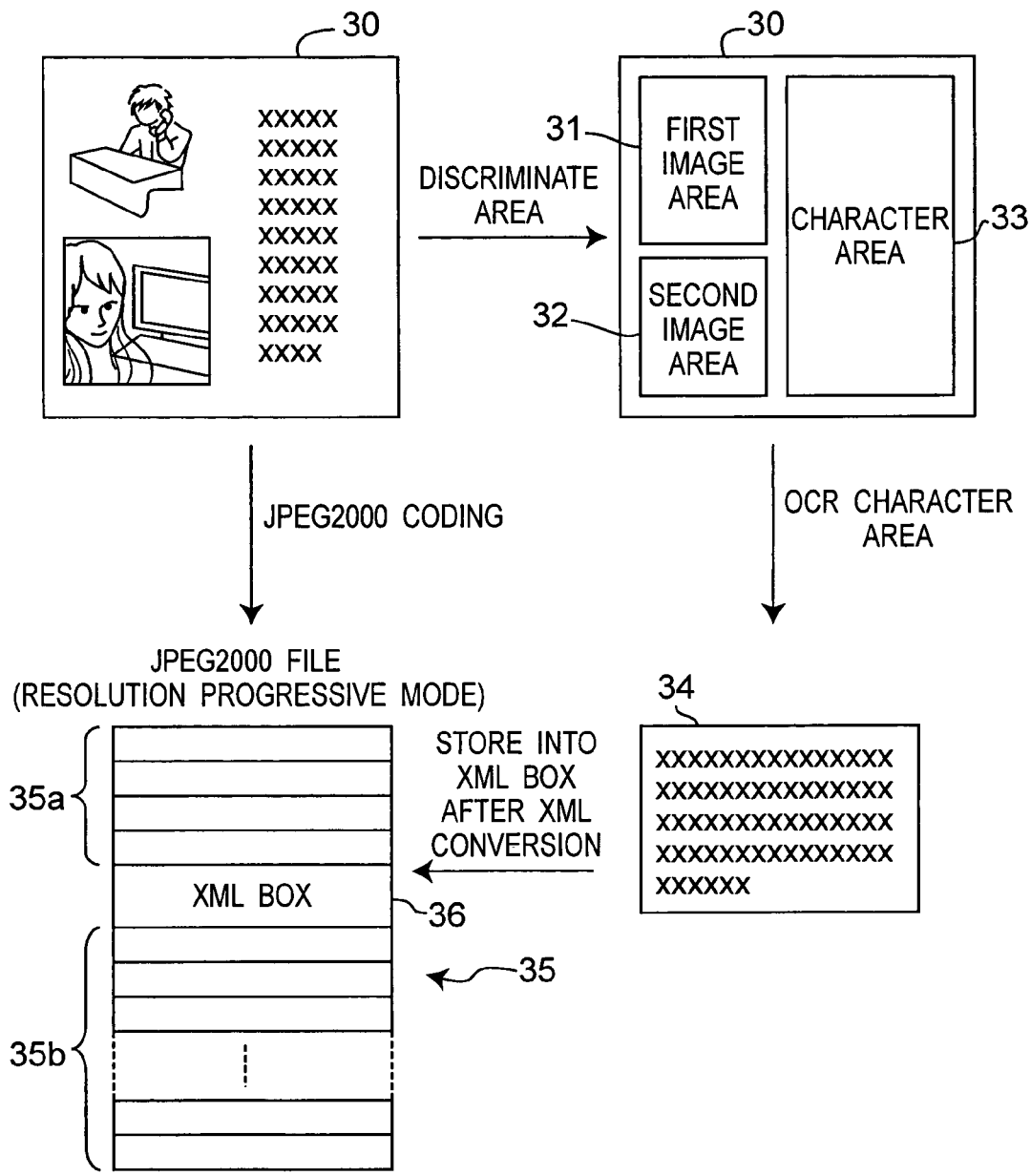

Fig. 10

| LL | HL1 | LH1 | HH1 | HL2 | ..... | HH2 | XML BOX | HL3 | ..... | HH3 |

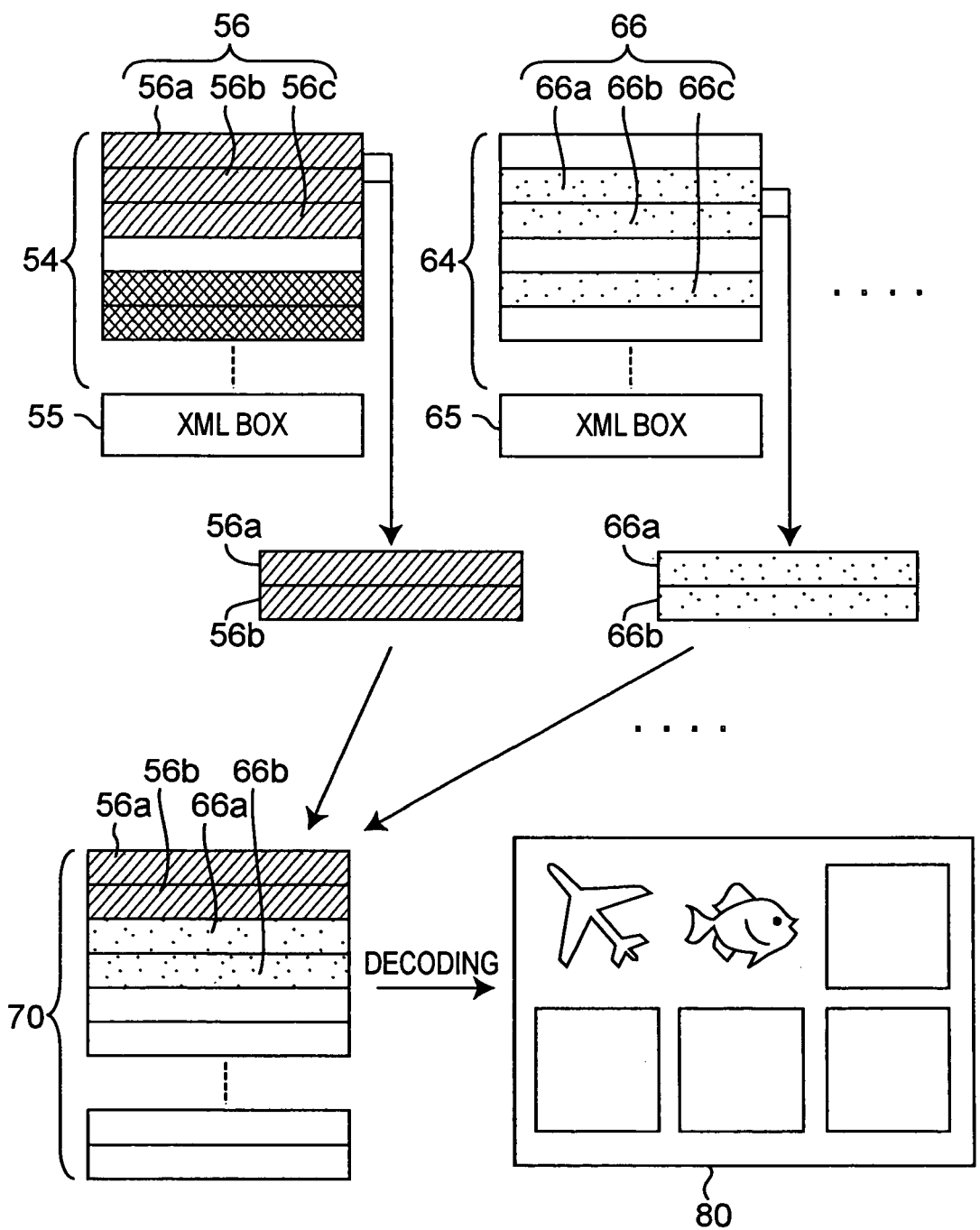

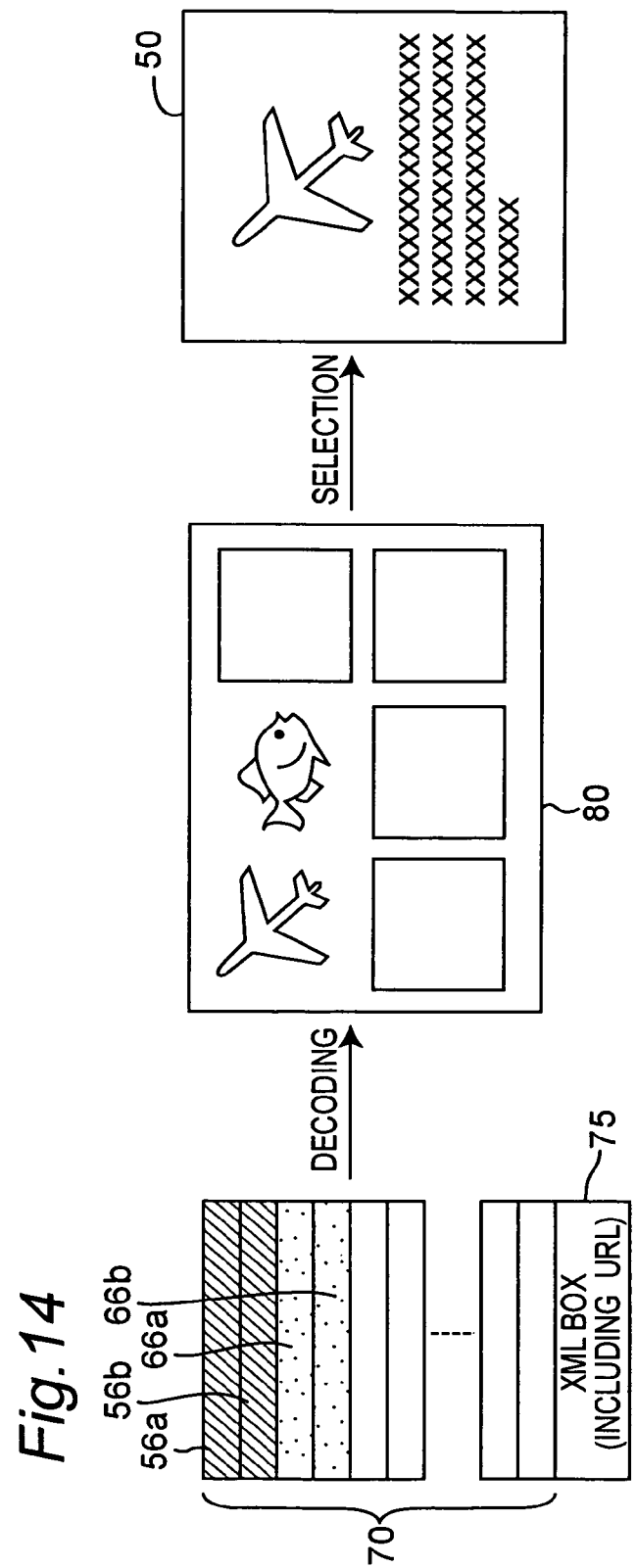

JPEG2000 CODING AND/OR DECODING APPARATUS AND METHOD

This application is based on application No. 2003-87926 filed in Japan, the contents of which is hereby incorporated by reference.

BACKGROUND OF THE INVENTION

1. Field of the Invention

The present invention relates to a JPEG2000 coding and/or decoding apparatus and method.

2. Description of the Related Art

In present communication circumstance, when a terminal such as personal computer receives relatively large image data, it may take much time to complete receiving the data. Recently, to alleviate such dullness, it is known that it is possible to recognize general image content in the early receiving stages by coding an image data hierarchically in data compression coding at transmitting side and decoding the coded data and reproducing the image data each time the hierarchical coded data is received at receiving side, as disclosed in Japanese Patent Laid-open Publication No. 2001-218208.

However, in the prior art described above, the resolution of the image obtained in the early receiving stages is generally low, and thus, in many cases, it is not sufficient to allow for reading characters contained in text area while allowing for recognizing a schema of the image area contained in the image data. To accomplish fine readability of characters, it is considered to improve the resolution of the image by keeping reception and decoding of coded data, but in that case, it takes much time and many resources such as memory are required particularly at receiving side.

Furthermore, a technique is known in which an area/areas (image or character area) in image identified by object discrimination analysis is/are extracted from a plurality of images based on data coming from transmitting side and extracted image or character areas are displayed in index form on an image plane at receiving side. In this technique, in general, all of coded data coming from transmitting side is decoded to convert it to image data and each of areas is extracted from the image data. In this case, however, much memory area is needed for processing a plurality of image data and control for the process becomes complicated at receiving side, and thus it is problematic to require much time until all of image or character areas is completely displayed in index form.

SUMMARY OF THE INVENTION

Therefore, it is an object of the present invention to provide a JPEG2000 coding and decoding apparatus that can accomplish reduction of processing time and saving of resources such as memory at receiving side in transmitting and receiving data processed particularly in JPEG2000 form.

In an aspect of the present invention, there is provided a JPEG2000 coding apparatus comprising: a JPEG2000 coder which codes an image data to convert it to JPEG2000 file; an area discriminator which discriminates an area defined by each object contained in said image data and specifies type of the object; an XML data producer which performs character recognition processing on the area discriminated as that containing a character by said area discriminator to produce a text data and produces an XML data corresponding to said text data; an XML box adder which adds an XML box that can store a specific data into a bit stream constructing said JPEG2000 file so as to be positioned in back of a predetermined level of wavelet decomposition and causes said XML box to store said XML data produced by said XML data producer.

Furthermore, there is provided a JPEG2000 decoding apparatus for receiving and decoding a JPEG2000 file produced by a JPEG2000 coding apparatus described in claim 1, the JPEG2000 decoding apparatus comprising: a JPEG2000 decoder which decodes JPEG2000 file to convert it to an image data; a selector which causes user to select whether to read an XML box added into a bit stream of JPEG2000 file in the middle of JPEG2000 decoding executed by the JPEG2000 decoder; and an XML data processor which processes the XML data stored in the XML box to acquire a text data.

In addition, in another aspect of the present invention, there is provided a JPEG2000 coding apparatus comprising: a JPEG2000 coder which codes an image data to convert it to JPEG2000 file; an area discriminator which discriminates an area defined in each of objects contained in said image data and acquires a position information of the area; an XML data producer which produces XML data corresponding to position information of each area discriminated by the area discriminator; an XML box adder which adds an XML box that can store a specific data into a bit stream constructing said JPEG2000 file and causes said XML box to store said XML data produced by said XML data producer.

Still further, there is provided a JPEG2000 decoding apparatus for receiving and decoding a JPEG2000 file produced by a JPEG2000 coding apparatus. The JPEG2000 decoding apparatus includes a JPEG2000 decoder which decodes a JPEG2000 file; a position information acquirer which acquires a position information of each area discriminated by the area discriminator based on the XML data stored in the XML box added into each JPEG2000 file; a coded data specifier which specifies coded data in each JPEG2000 file corresponding to each area based on the position information acquired by the position information acquirer; and a coded data cutter which cuts off a part of the coded data specified by the coded data specifier. In this aspect, the coded data cutter may acquire only a part of coded data specified by the coded data specifier, the part of coded data having resolution sufficient to index display, and may form an index file with the acquired coded data. Furthermore, the JPEG2000 decoding apparatus may include an XML box adder which adds an XML box to the index file and cause the XML box to store an information data for permitting to specify a source file from which each area constituting the index file is extracted, wherein the JPEG2000 decoder may decode the source file corresponding to the area in response to selecting each area on the image index displayed.

In another aspect of the present invention, there is provided a JPEG2000 coding method for generating JPEG2000 file, comprising steps of: coding an image data to convert it to JPEG2000 file; discriminating an area defined by each object contained in said image data and specifying type of the object; performing character recognition processing on the area discriminated as that containing a character to produce a text data and producing an XML data corresponding to said text data; and adding an XML box that can store a specific data into a bit stream constructing said JPEG2000 file so as to be positioned in back of a predetermined level of wavelet decomposition and causing said XML box to store said XML data.

In addition, there is provided a JPEG2000 decoding method for receiving and decoding a JPEG2000 file produced using a JPEG2000 coding method described in claim 7, the JPEG2000 decoding method comprising steps of: decoding JPEG2000 file to convert it to an image data; causing user to select whether to read an XML box added into a bit stream of JPEG2000 file in the middle of JPEG2000 decoding; and processing the XML data stored in the XML box to acquire a text data.

Furthermore, there is provided a JPEG2000 coding method for generating JPEG2000 file comprising steps of: coding an image data to convert it to JPEG2000 file; discriminating an area defined in each of objects contained in said image data and acquiring a position information of the area; producing XML data corresponding to position information of each discriminated area; adding an XML box that can store a specific data into a bit stream constructing said JPEG2000 file and causing said XML box to store the produced XML data.

Still further, there is provided a JPEG2000 decoding method for receiving and decoding a JPEG2000 file produced using a JPEG2000 coding method described in claim 9, the JPEG2000 decoding method comprising steps of: decoding a JPEG2000 file; acquiring a position information of each discriminated area based on the XML data stored in the XML box added into each JPEG2000 file; specifying coded data in each JPEG2000 file corresponding to each area based on the acquired position information; and cutting off a part of the specified coded data.

BRIEF DESCRIPTION OF THE DRAWINGS

FIG. 2 is a block diagram showing the basic configuration of the MFP.

FIG. 3 is a block diagram showing the basic configuration of the terminal device.

FIG. 4 is a flow of a process of adding an XML box to JPEG2000 file and storing a predetermined XML data into the XML box on the MFP side.

FIG. 10 is a diagram showing a configuration of JPEG2000 bit stream added with XML box in back of coded data at wavelet decomposition level 2.

FIG. 13 is a diagram explaining a flow of a process of receiving a plurality of JPEG2000 files added with an XML box, extracting and index displaying a predetermined area from each JPEG2000 file on the terminal device side.

FIG. 14 is a diagram showing an example in which source image file, that is, image data file from which each area is extracted, is related to a bit stream of index file.

DESCRIPTION OF THE PREFERRED EMBODIMENTS

Embodiments of the present invention will be described below with reference to the accompanying drawings.

First Embodiment

Figure 1:
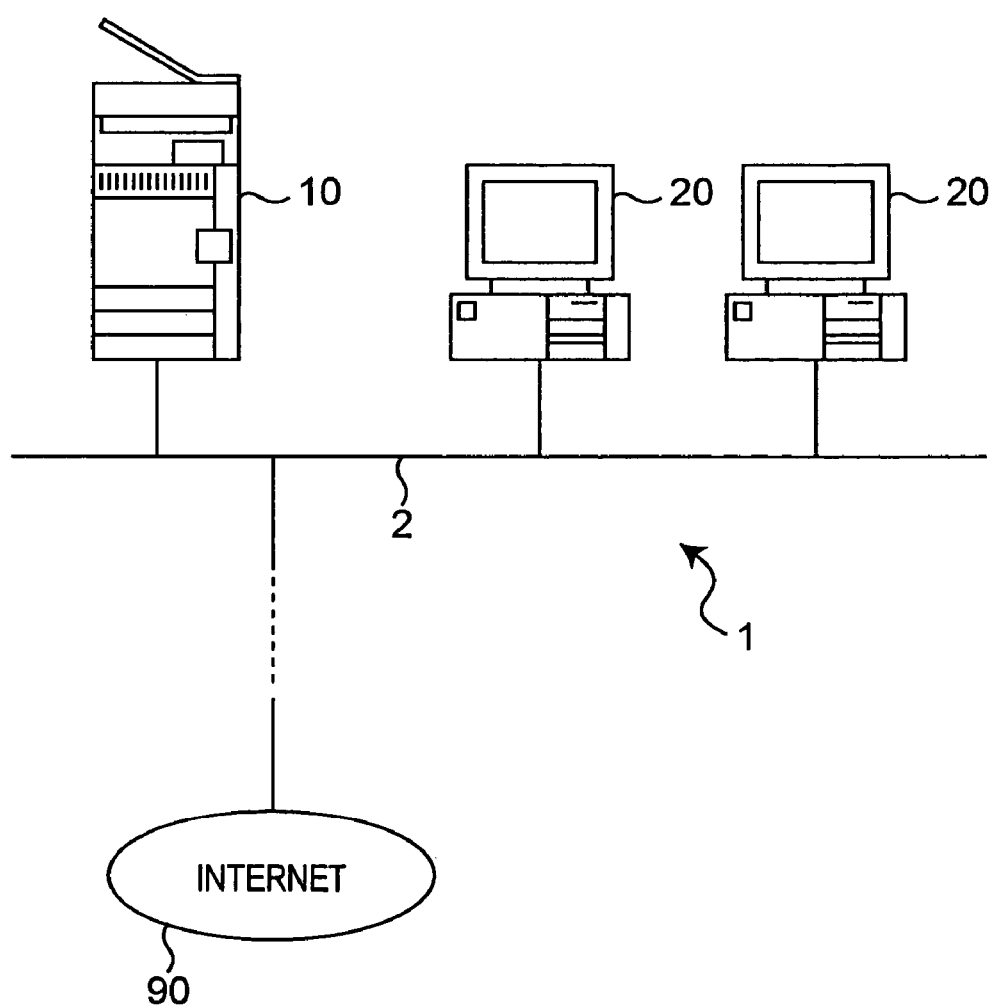
FIG. 1 is a schematic diagram showing a network system constituted by MFP according to the first embodiment of the present invention and terminal devices.

FIG. 1 schematically shows a network system constituted by a multiple function peripheral according to the first embodiment of the present invention and terminal devices. The network system 1 includes a Multiple Function Peripheral ("MFP") 10 having multiple functions of a printer, a facsimile, a copier, a scanner, and the like and a plurality of terminal devices 20 such as personal computers or the like. These devices are connected to each other through a network bus 3 to make it possible to transmit and receive data. In the network system 1, for example, the information data (including image data) may be transmitted from the terminal devices 20 to the MFP 10 to make it possible to print the information data, and a manuscript may be read by a scanner 11 (see FIG. 2) of the MFP 10 to acquire information data, and then the information data may be transmitted to the terminal devices 20 to make it possible to store.

The network system 1 may be connected to the internet 90 through the network bus 2. In this case, the MFP 10 can receive information data from a remote terminal device on another network through the internet 90 and can print the information data if necessary.

FIG. 2 is a block diagram showing the basic configuration of the MFP. The MFP 10 includes a CPU 3 which executes various instructions on the basis of a predetermined operating program to control the respective components in the MFP 10, a JPEG2000 coder (expressed as "JPEG2000 coding section" in FIG. 2) 4 which converts an image data in a specific format such as bitmap format to JPEG2000 file, a network interface card (expressed as "NIC" in FIG. 2) 6 connected to external devices on the network system 1 (see FIG. 1) to serve as data output and input port, a operation section 7 which is operated by user to execute various input setting, a ROM 8 which stores the operating system and the like, a RAM 9 which temporarily stores data such as coded data acquired by the JPEG2000 coder 4, a scanner 11 which scans a manuscript to acquire image data in bitmap format. A memory 4a for wavelet transformation used upon wavelet transformation is connected to the JPEG2000 coder 4. These components are connected to each other through a bus 19 and the like to make it possible to transmit or receive data.

On the other hand, FIG. 3 is a schematic diagram showing internal configuration of terminal device 20. The terminal device 20 includes a CPU 21 which executes various instructions on the basis of a predetermined operating program to control the respective components in the terminal device 20, a JPEG2000 decoder (expressed as "JPEG2000 decoding section" in FIG. 3) 22 which decodes the JPEG2000 file, for example, received from external devices, a network interface card (expressed as "NIC" in FIG. 3) 23 connected to external devices on the network system 1 (see FIG. 1) to serve as data output and input port, an input section 24 which receives various setting inputs provided through a keyboard, a mouse and the like, a hard disk drive (expressed as "HDD" in FIG. 3) 25, a RAM 26 which temporarily stores various data in each process, a ROM 27 which stores the operating system and the like, a display 28 which displays various information such as image processed by terminal devices 20.

In the first embodiment, upon transmitting and receiving in which coded data produced on the MFP 10 side is transmitted to the terminal device 20 and is decoded and displayed on the terminal device 20 side, a specific process is performed to accomplish reduction of processing time and saving of memory on the terminal device 20 side using well known characteristic of JPEG2000 file which can include XML (eXtensible Markup Language) data as well as data corresponding to image.

To perform such process, as shown in FIG. 2, MFP 10 includes, in addition to components described above, an area discriminator 12 which discriminates a type of area constituting a JPEG2000 file upon producing the JPEG2000 file by JPEG2000 coder 4, an XML data producer which produces an XML data based on an information included in the area discriminated by the area discriminator 12, and an XML box adder 14 which adds an XML box to JPEG2000 file.

FIG. 4 is a diagram explaining a flow of a process performed by components described above, in which an XML box is added into JPEG2000 file and a specific XML data is stored into the XML box. On MFP 10, when a data is input via NIC 6 externally or a manuscript is scanned by scanner 11 to acquire an image data 30, coding of the image data is executed by JPEG2000 coder 4 in resolution progressive mode. "Resolution progressive mode" is a mode in which data constituting the acquired JPEG2000 file are arranged in the order in which the coded data corresponding to low resolution is positioned ahead. When the coded data arranged in such resolution progressive mode are received and displayed on terminal device 20 side, the coded data are displayed so that it transforms from low resolution image to high resolution image to become clear gradually.

Also, on MFP 10, when an image 30 is acquired, in addition to JPEG2000 coding process described above, respective areas are defined by each object included in image data 30, and type of these areas are discriminated, that is, it is determined whether each area is character area or image area by area discriminator 12. And thus, for example, image data 30 shown in FIG. 4 is recognized as a data including a first image area 31, a second image area 32 and a character area 33. Subsequently, OCR is executed to character area 33 by XML data producer 13 to produce a text data 34. Thereafter, the text data 34 is converted to XML data.

In addition, an XML box 36 is added into a bit stream (referred to as "JPEG2000 bit stream" hereafter) in which JPEG2000 coded data are arranged in the order in which data corresponding to low resolution is positioned ahead so that XML box 36 is inserted in back of a predetermined wavelet decomposition level, that is, in back of data corresponding to a predetermined resolution by XML box adder 14. And then, XML data produced by XML converting text data 34 is stored into XML box 36. In FIG. 4, reference numeral 35 denotes a configuration example of JPEG2000 bit stream including XML box 36, reference numeral 35a denotes a coded data positioned at upper level compared with XML box 35 and corresponding to relatively low resolution image, and reference numeral 35b denotes a coded data positioned at lower level compared with XML box 35 and corresponding to relatively high resolution image.

With processes described above, a JPEG2000 file in which XML box 36 is added is produced, XML box 36 being able to store XML data produced by XML converting text data 34.

Figure 5:
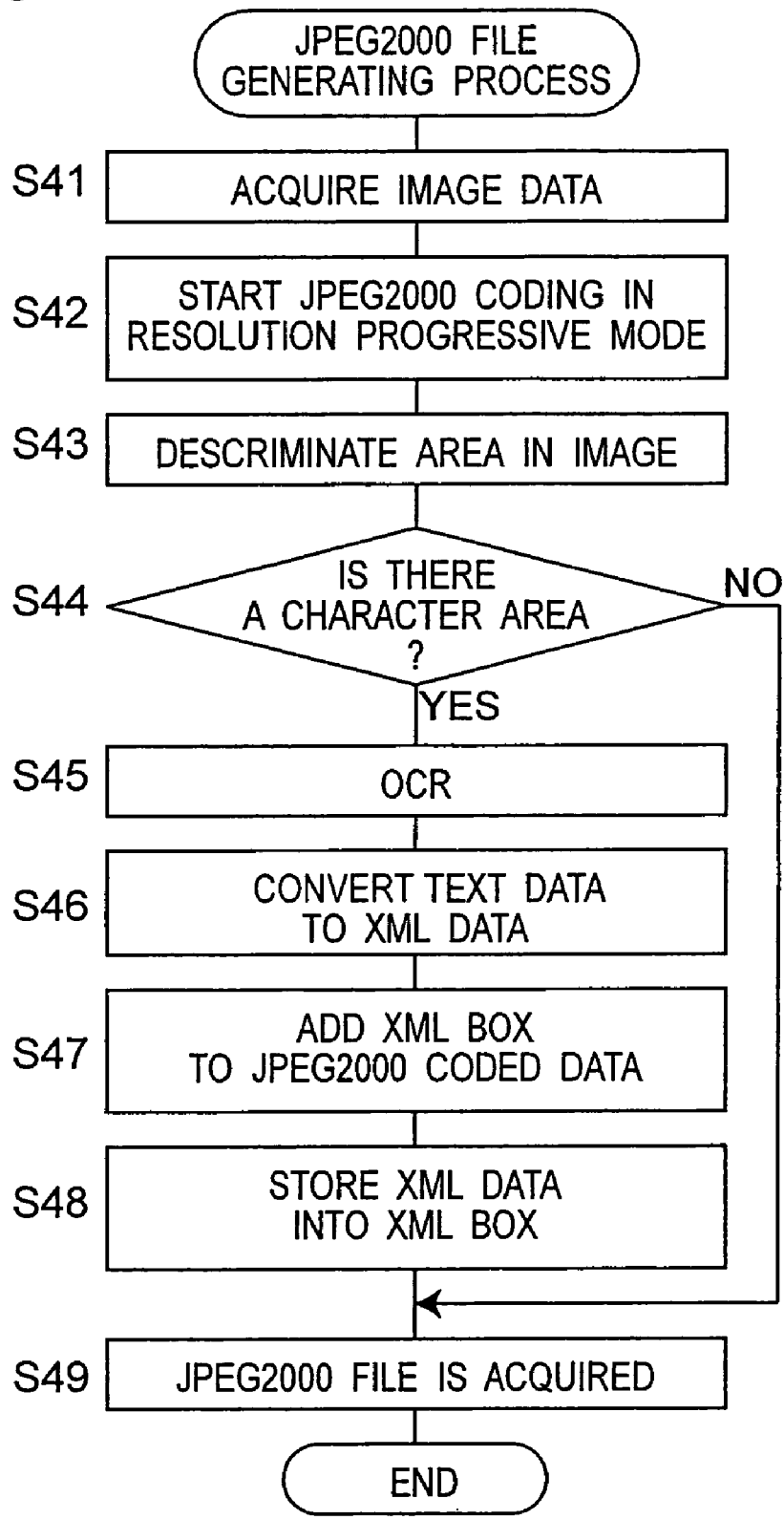
FIG. 5 is a flow chart of a process of generating JPEG2000 file added with an XML box.

FIG. 5 is a flow chart of a process of generating a JPEG2000 file, performed by MFP 10 as described above. This process is performed by CPU 3 based on a program stored in ROM 8. In this process, when a data is input via NIC 6 externally or a manuscript is scanned by scanner 11 to acquire an image data 30 (step S41), JPEG2000 coding process in resolution progressive mode is started (step S42). Subsequently, type of the area constituting image data is discriminated (step S43).

After step S43, it is determined whether there is a character area in an image data or not based on the area discrimination result obtained in step S43 (step S44). As a result, when it is determined that there is no character area in the image data, CPU 3 shifts to step S49 since it is not necessary to make consideration for readability of character. In step S49, a JPEG2000 file constituted by only coded data is acquired.

On the other hand, when it is determined that there is a character area in step S44, OCR is executed to acquire a text data (step S45), and the text data is XML converted to produce an XML data (step S46). Subsequently, an XML box 36 is added into JPEG2000 coded data to be positioned at a specific position. Thereafter, the XML data produced in step S46 is stored into XML box 36 (step S48). As a result, a JPEG2000 file is acquired, the JPEG2000 file having a bit stream configuration in which XML box 36 to store XML data is added. This is the end of process of generating JPEG2000 file.

It is noted that JPEG2000 coding process started from step S42 and respective processes for adding XML data in step S43 to S48 are performed one by one according to flow chart in FIG. 4, but not limited to this aspect, both of processes may be performed simultaneously.

Figure 6:
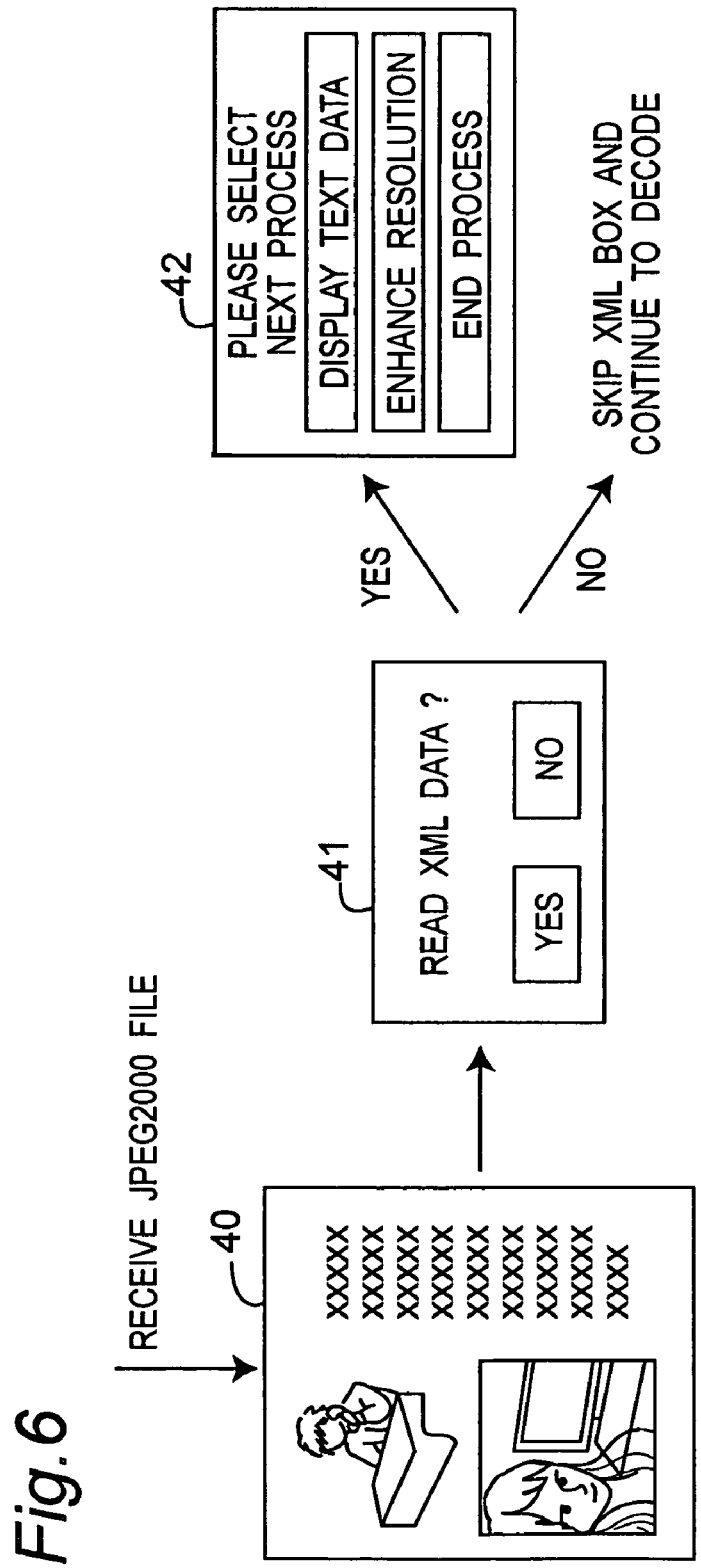
FIG. 6 is a diagram explaining a flow of decoding JPEG2000 file on the terminal device side.

FIG. 6 is a diagram explaining a flow of JPEG2000 file decoding performed on the terminal device 20 side when JPEG2000 file added with XML box 36 as described above is received. In this JPEG2000 file decoding, first, an application software is activated on terminal device 20 side for displaying image based on JPEG2000 file received from MFP 10. User can provide various instructions such as reading XML data, continuing decoding process via the application software. Such application software is pre-installed in terminal device 20, stored in HDD 25 and started if necessary.

Data constituting JPEG2000 file are transmitted in ascending order of the corresponding resolution, that is, data at upper level of coded data 35a (See FIG. 4) is first transmitted. When the data is received on terminal device 20 side, the data is automatically decoded in order of precedence. As a result, relatively low resolution image 40 is acquired. Subsequently, a selecting screen 41 including a message "READ XML DATA ?" and selecting buttons "YES" and "NO" is represented on display 28 of terminal device 20, as well as image 40, for permitting user to select whether XML box 36 is read or skipped. When user selects "NO" on this screen 41, XML box 36 is skipped, coded data 35b (See FIG. 4) corresponding to relatively high resolution image are received, and decoding process for coded data 35b is continued.

On the other hand, when user selects "YES" on screen 41, next selecting screen 42 is represented on display 28. This selecting screen 42 includes selecting buttons "DISPLAY TEXT DATA", "ENHANCE RESOLUTION" and "END PROCESS" and user can select one of these selecting buttons.

Figure 7:
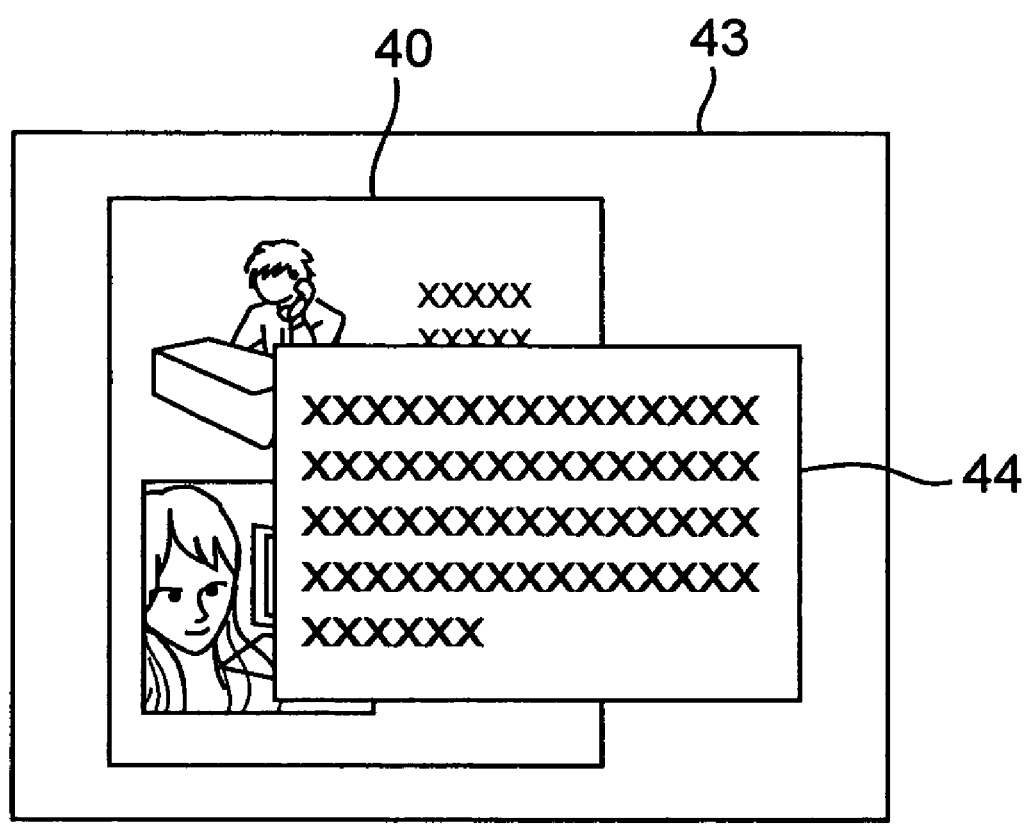
FIG. 7 is a diagram showing condition in which a low-resolution image and text data are displayed on the terminal device side.

When user selects "DISPLAY TEXT DATA" on selecting screen 42, XML data stored in XML box 36 is read into terminal device 20 and a browser is started up. Thus, a text data 44 produced by converting the read-in XML data is displayed as well as low resolution image 40 through the browser on display 28 of terminal device 20 as shown in FIG. 7. Reference numeral 43 denotes screen of display 28. In this manner, readability of character in character area 33 included in original image data 30 (See FIG. 4) can be obtained at relatively earlier stage of receiving coded data of JPEG2000 file by reading XML data stored in XML box 36 and representing text data 44 at the stage in which resolution of image 40 represented on display 28 is low. The browser is software pre-installed in terminal device 20, stored in HDD 25 and read if necessary.

When user selects "ENHANCE RESOLUTION", coded data corresponding to relatively high resolution image are received, and decoding process for coded data is continued. When user selects "END PROCESS", this process is ended without performing further decoding process.

Figure 8:
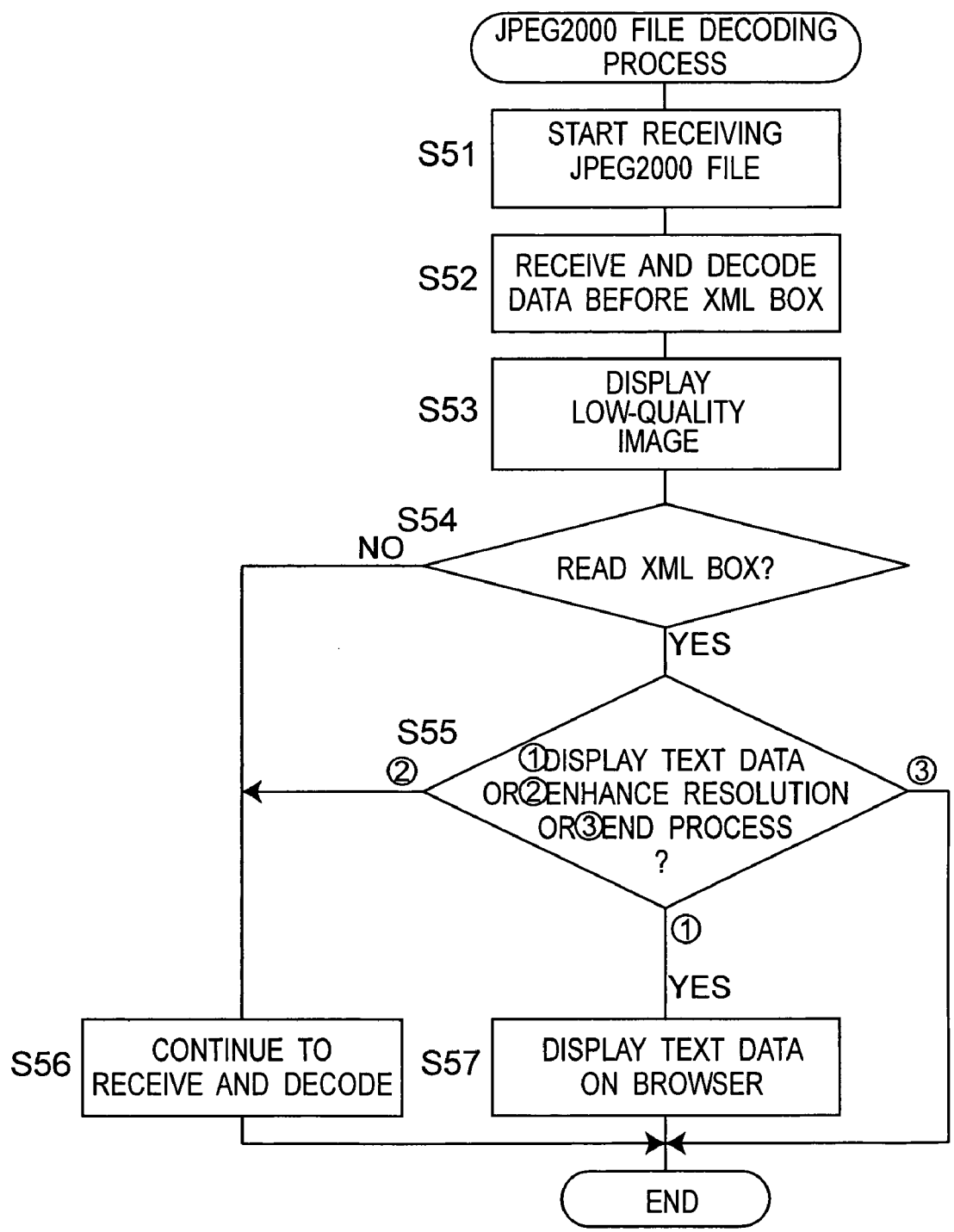
FIG. 8 is a flow chart of a progress of decoding JPEG2000 file on the terminal device side.

FIG. 8 is a flow chart of JPEG2000 file decoding process performed on terminal device 20 as described above. When receiving JPEG2000 file from MFP 10 is started (step S51), terminal device 20 decodes the received data sequentially. Such receiving and decoding are performed for data which is positioned in front of XML box 36 included in a JPEG2000 bit stream and which is corresponding to relatively low resolution image (step S52). Then, low resolution image is represented on display 28 based on coded data (step S53).

Subsequently, it is determined that whether user selected to read XML box 36 or not (step S54). As a result, when it is determined that user selected not to read XML box 36, CPU 21 shifts to step S56 to receive coded data positioned at lower level compared with XML box 35 and corresponding to relatively high resolution image (See FIG. 4) and sequentially decode the received data. This is the end of the process at the point of receiving and decoding all data constituting a JPEG2000 bit stream.

On the other hand, in Step S54, when it is determined that user selected to read XML box 36, it is determined which instruction of "DISPLAY TEXT DATA", "ENHANCE RESOLUTION", and "END PROCESS" was selected by user (step S55). As a result, when it is determined that user selected to display text data, the text data is represented on display 28 as well as low resolution image via browser (step S57).

When it is determined that user selected to enhance resolution" in step S55, CPU 21 shifts to step S56 to receive coded data positioned at lower level compared with XML box 35 and corresponding to relatively high resolution image (See FIG. 4) and sequentially decode the received data. This is the end of the process at the point of receiving and decoding all data constituting a JPEG2000 bit stream.

Furthermore, in step S55, when it is determined that user selected to end the process, CPU 21 end the process.

Figure 9:
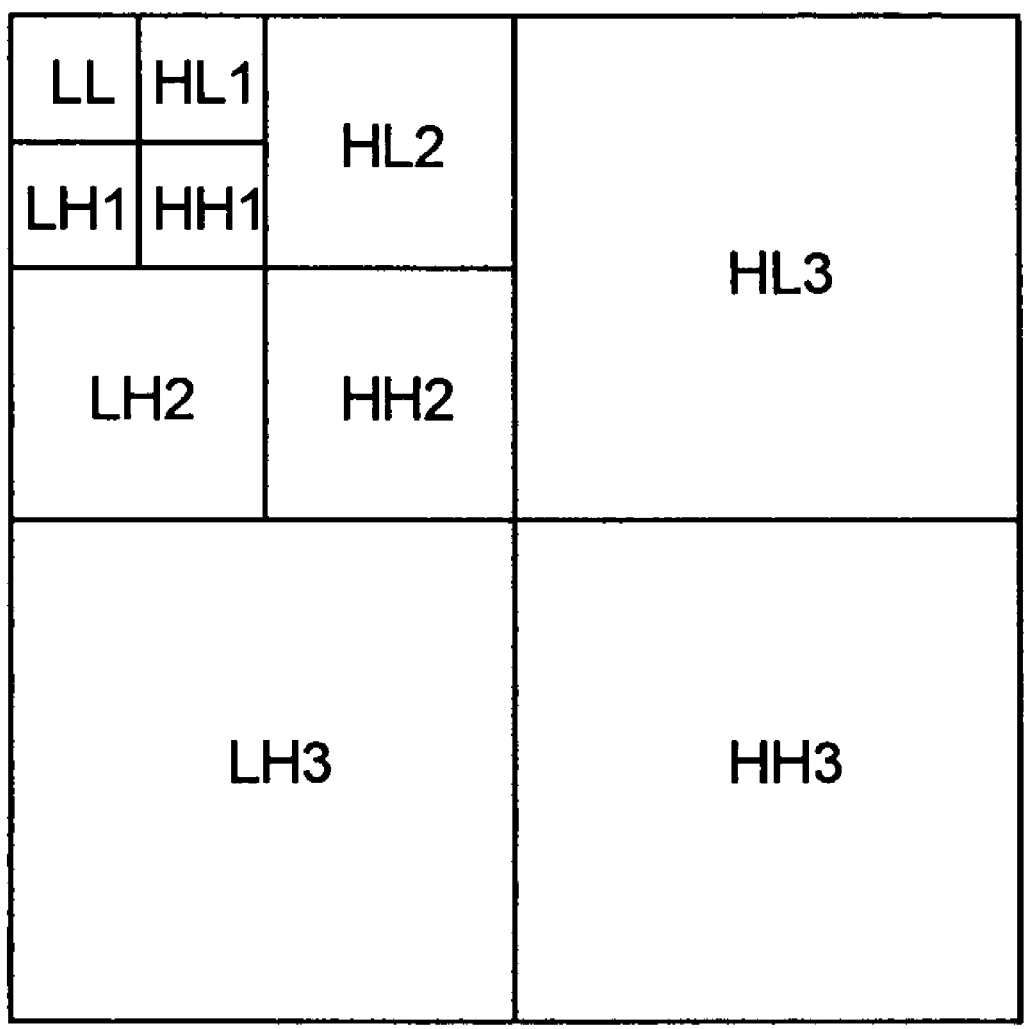
FIG. 9 is a diagram showing an image data coded at wavelet subband decomposition level 3.

For reference, when image data is coded at wavelet decomposition level 3 by each tile defined to have a predetermined size, the coded data is in the condition in which it is decomposed to subbands comprising high frequency component and low frequency component as shown in FIG. 9. In this FIG. 9, "LL" denotes horizontal and perpendicular low frequency component, "LH" denotes horizontal low frequency component and perpendicular high frequency component, "HL" denotes horizontal high frequency component and perpendicular low frequency component, and "HH" denotes horizontal and perpendicular high frequency component. As a numeral added to "LL", "LH", "HL" or "HH" is smaller, lower resolution image is acquired based on the corresponding data.

Figure 10:
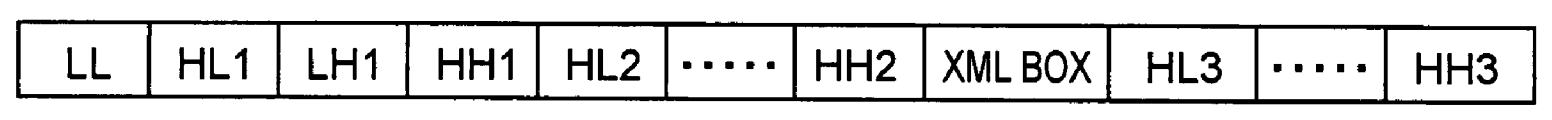

FIG. 10 is a diagram showing showing a configuration of JPEG2000 bit stream added with XML box 36. In this JPEG2000 bit stream, XML box 36 is added in back of wavelet decomposition level 2 (HL2, LH2, HH2). In decoding such JPEG2000 bit stream, on terminal device 20, codec data corresponding "LL"- "HH2" and positioned in front of XML box 36 in a bit stream are received and automatically decoded. And then, if necessary, XML box 36 is read. In addition, to enhance resolution of image 40 represented on display 28, coded data corresponding to "HL3"- "HH3" and positioned in back of XML box 36 are sequentially received and decoded.

As apparent from the above description, according to the first embodiment, it is possible to obtain readability of characters contained in original image 30 in earlier stage of receiving on terminal device 20 by reading XML data stored in XML box 36 in the stage in which resolution of image acquired in resolution progressive mode is low. As a result, a processing time on terminal device 20 needed until user can understand the content of image containing a character can be reduced, and in this case, since some data constituting JPEG2000 file produced on MFP 10 is not received, saving of memory on terminal device 20 can be accomplished.

Second Embodiment

In the first embodiment described above, it can be accomplished to obtain readability of characters contained in original image in earlier stage of receiving on terminal device 20 using JPEG2000 file added with XML box, and differently from the first embodiment, in the second embodiment, it can be accomplished to display indexes rapidly using JPEG2000 file added with XML box.

Figure 11:
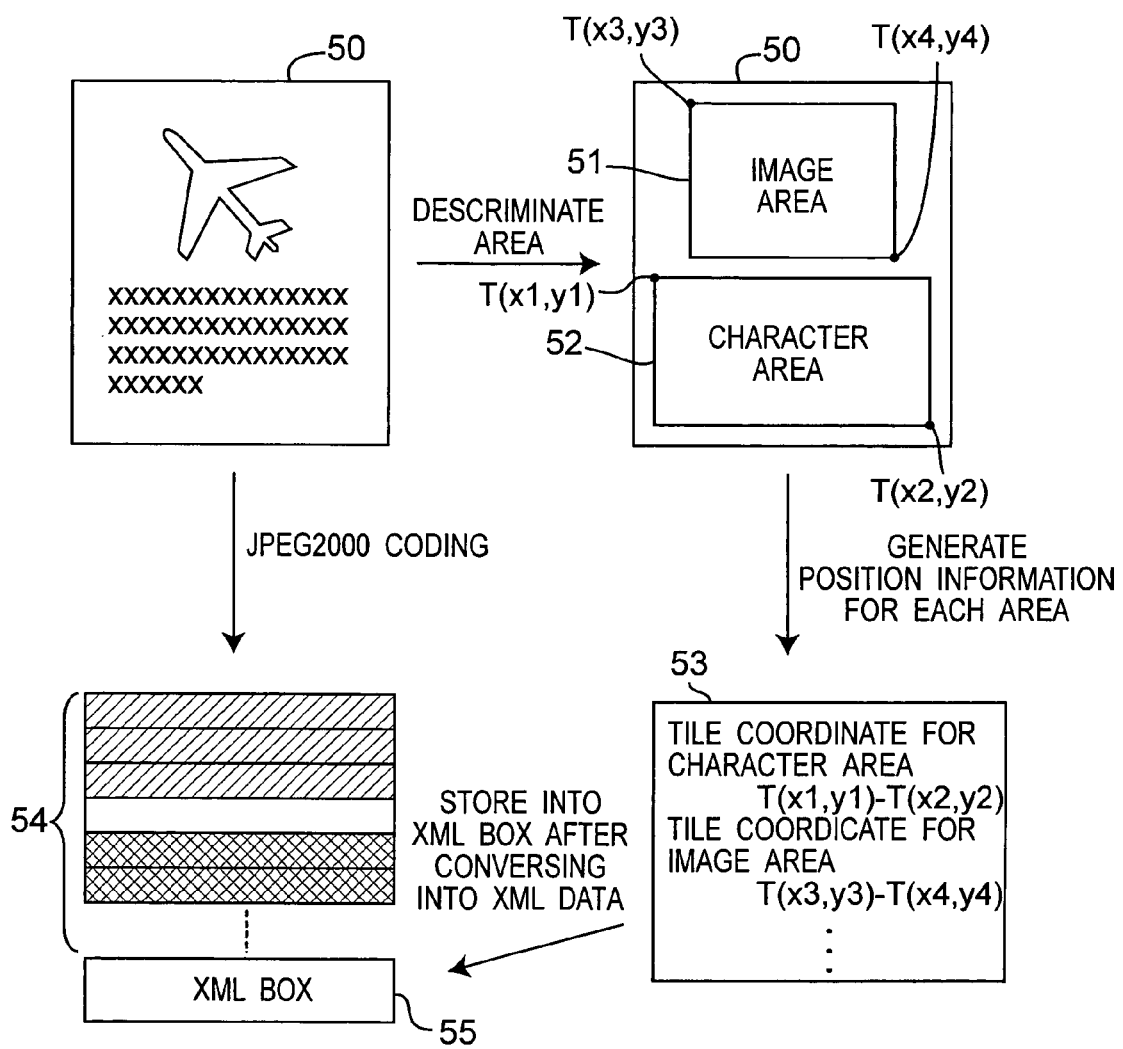
FIG. 11 is a flow of a process of adding an XML box to JPEG2000 file and storing a predetermined XML data into the XML box, according to the second embodiment of the present invention.

FIG. 11 is a diagram explaining a flow of a process of adding an XML box to JPEG2000 file and storing a predetermined XML data into the XML box. On MFP 10, when a data is input via NIC 6 externally or a manuscript is scanned by scanner 11 to acquire an image data 30, coding of the image data is executed by JPEG2000 coder 4 by each tile being of a basic unit of coding process.

In addition to such JPEG2000 coding process, on MFP 10, when image 50 is acquired, respective areas are defined by each object included image data 50 and type of these areas are discriminated, that is, it is determined whether each area is character area or image area by area discriminator 12 (See FIG. 2). And thus, for example, image data 50 shown in FIG. 11 is recognized as a data including an image area 51 and a character area 52. Subsequently, data 53 which represent information of position for respective areas 51, 52 (referred to as "position information data", hereafter) in image data 50, are produced. In this case, as shown in FIG. 11, each area is defined as being rectangular-shaped, and the position information is represented as tile coordinates of vertexes present on a diagonal line for respective areas. In the concrete, position information of character area 52 is represented as tile coordinate T(x1,y1)-T(x2,y2), and position information of image area 51 is represented as tile coordinate T(x3,y3)-T(x4, y4).

Thereafter, the position information 53 is XML converted. Subsequently, an XML box 55 is added into a JPEG2000 bit stream 54 comprising coded data arranged in a predetermined order, at a specific position (at the end of the bit stream, in this second embodiment). And then, XML data to which position data 53 is XML converted, is stored in XML box 55.

With the processes described above, JPEG2000 file added with XML box 55 for storing XML data to which position information data 53 is XML converted, is generated.

Figure 12:
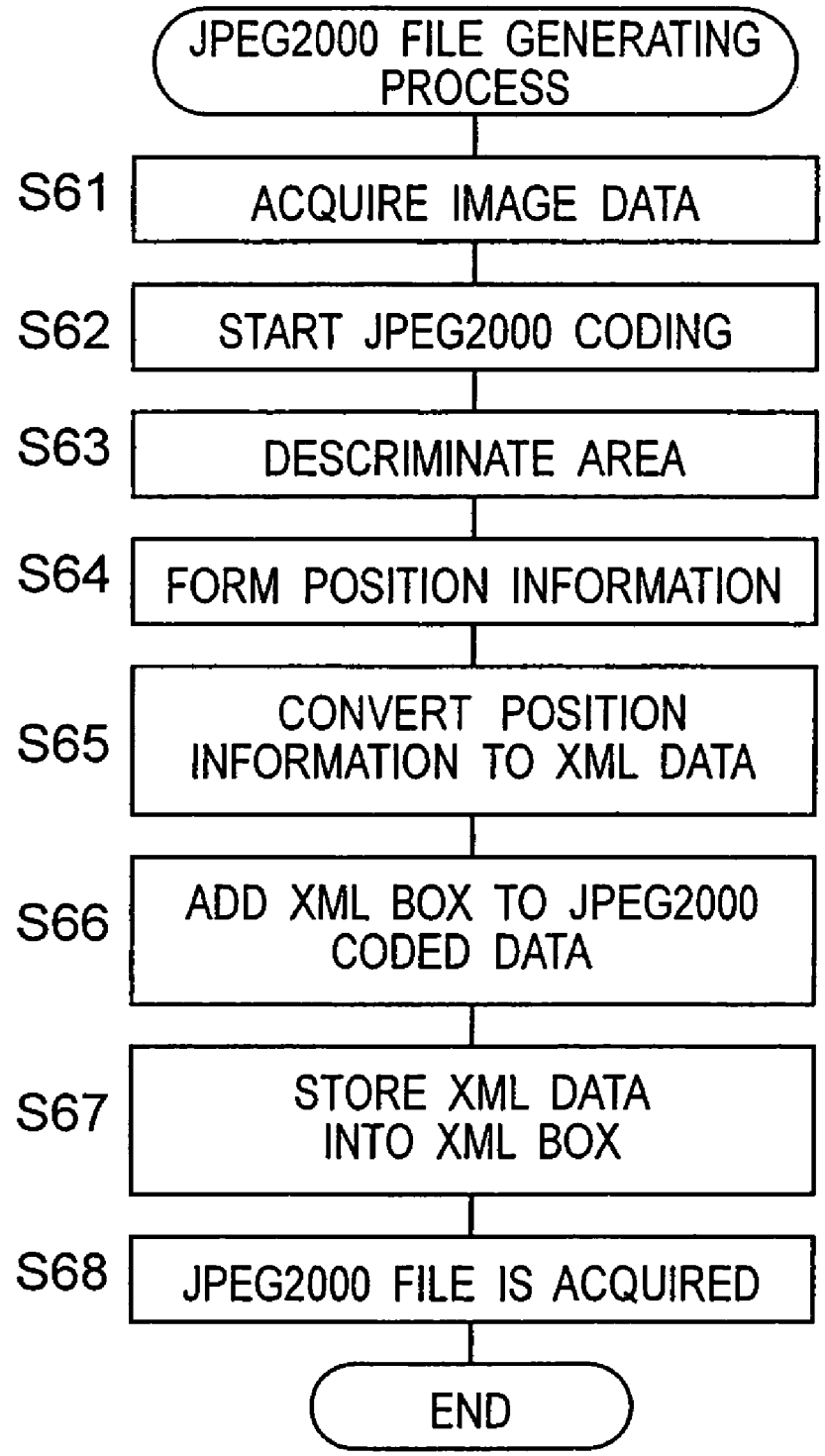
FIG. 12 is a flow chart of a process of generating JPEG2000 file, according to the second embodiment of the present invention.

FIG. 12 is a flow chart of a process of generating JPEG2000 file performed on MFP 10, according to the second embodiment. In this process, when a data is input via NIC 6 externally or a manuscript is scanned by scanner 11 to acquire an image data 30 (step S61), JPEG2000 coding process is started (step S62). Subsequently, type of the area constituting image data is discriminated (step S63).

Then, position information representing position of each area discriminated in step S63, is produced to acquire position information data (step S64). In addition, the position information data is XML converted (step S65). Subsequently, XML box 55 is added into JPEG2000 coded data. Thereafter, XML data to which position information is XML converted, is stored in XML box 55 (step S67). As a result, a JPEG2000 file is generated, which has a bit stream configuration added with XML box 55 storing position information data (step S68). This is the end of JPEG2000 file generating process.

It is noted that JPEG2000 coding process started from step S62 and respective processes for adding XML data in step S63 to S67 are performed one by one according to flow chart in FIG. 12, but not limited to this aspect, both of processes may be performed simultaneously.

FIG. 13 is a diagram explaining a flow of a process of receiving a plurality of JPEG2000 files added with an XML box55 as described above, extracting and index displaying a predetermined area from each JPEG2000 file on the terminal device 20 side. In this process, first, an application software is activated on terminal device 20 side for extracting and index displaying respective areas included in JPEG2000 file received from MFP 10. User can provide various instructions such as setting of areas to be index displayed via the application software. Such application software is pre-installed in terminal device 20, stored in HDD 25 and started if necessary.

In the second embodiment, although each JPEG 2000 file is received on terminal device 20, it is not automatically decoded but kept as it is until instruction of index displaying is provided. In FIG. 13, the JPEG2000 files kept as they are, are represented as JPEG2000 bit streams 54, 64. At the end of each JPEG2000 bit stream 54, 64, XML boxes 55,. 65 storing the XML converted position information data are added, respectively. It is noted that only two JPEG2000 bit stream 54, 64 are held up as an example in this embodiment, but number of JPEG2000 bit stream is not limited to this example, and when there is a JPEG2000 bit stream different from JPEG 2000 bit streams 54, 64, it is processed just as JPEG2000 bit streams 54, 64.

An example in the case in which "image areas" are extracted from each JPEG2000 bit stream 54, 64 and index displayed, is illustrated. When user instructs to index display image areas, XML boxes 55, 65 added into files are referenced, and position information for the image areas are acquired.

Based on these position information, decoded data (tile data) 56, 66 corresponding to tiles including image areas in JPEG2000 bit stream 54, 64, are specified. Tile data 56 and 66 are constituted by coded data 56a, 56b, 56c and 66a, 66b, 66c, corresponding to different resolution, respectively. And then, coded data which can provide resolution needed to be index displayed, that is, coded data 56a, 56b and 66a, 66b corresponding to low resolution are extracted from tile data 56 and 66, respectively.

Therefore, coded data 56a, 56b and 66a, 66b extracted from JPEG2000 bit stream 54 and 64, respectively, are reconstructed for index displaying to generate a bit stream 70 of index file. When the index file is decoded, an index displaying image 80 is acquired. In FIG. 13, coded data 56a, 56b and 66a, 66b correspond to "air plane" and "fish" in index displaying image 80, respectively.

FIG. 14 is a diagram showing an example in which source image files, that is, image data file from which each area is extracted, are related to a bit stream 70 of index file. In this case, as described above with reference to FIG. 13, XML box to which source image files are related, that is, XML box 75 storing information data (eg. URL) to specify source image files of respective areas is added into a bit stream 70 of index files constituted by coded data extracted from each JPEG2000 file and corresponding to a specific area. When this index file is decoded, an index displaying image 80 is acquired and the source image files are related to respective areas included in image 80. For example, referring to FIG. 14, when user selects an image area representing "air plane" on upper left by mouse click and the like, a JPEG2000 file from which the area is extracted, is decoded and an original image 50 can be represented.

As apparent from the above description, according to the second embodiment, in extracting and index displaying areas from a plurality of JPEG2000 files on terminal device 20, coded data corresponding to each of areas are extracted based on position information stored in XML box added into respective files, and an index file for index displaying is reconstructed by the extracted data and decoded. As a result, it can be accomplished to save memory on terminal device 20 without coding all JPEG2000 files received from MFP 10.

The present invention is not limited to the above illustrated embodiments, and various modifications and changes in design can be effective without departing from the spirit and scope of the present invention, as a matter of course. For example, in FIGS. 2 and 3, all configurations in MFP 10 and terminal device 20 are shown as hardware, but not limited to such aspect, and configurations such as a JPEG2000 coder 4, an area discriminator 12, an XML data producer 13, an XML box adder 14 and JPEG2000 decoder 22 can be configured as software.

Furthermore, in the embodiments described above, an example in the case in which coding process is performed hierarchically based on resolution is held up, but not limited to the case, and the present invention is applicable to the case in which coding process is performed hierarchically based on image quality (layer).

What is claimed is:

1. A JPEG2000 coding method for generating JPEG2000 file, comprising steps of:
   coding image data to convert it to JPEG2000 file;
   discriminating an area defined by each object contained in said image data and specifying type of the object;
   performing character recognition processing on the area discriminated as that containing a character to produce text data and producing XML data corresponding to said text data; and
   positioning an XML box that has stored said XML data into a bit stream constructing said JPEG2000 file in back of data corresponding to a predetermined resolution and in front of data corresponding to a higher resolution than said predetermined resolution.

2. A JPEG2000 decoding method for receiving and decoding a JPEG2000 file produced using said JPEG2000 coding method described in claim 1, the JPEG2000 decoding method comprising steps of:
   decoding said JPEG2000 file to convert it to image data;
   reading XML data stored in an XML box added into a bit stream constructing said JPEG2000 file in the middle of JPEG2000 decoding; and
   processing the XML data to acquire text data.

3. The JPEG2000 decoding method of claim 2, further comprising displaying the text data acquired by said XML data processor in the middle of JPEG2000 decoding executed by the JPEG2000 decoder.

4. The JPEG2000 decoding method of claim 3, further comprising allowing a user to select, using a selector, whether to read XML data stored in an XML box added into a bit stream constructing said JPEG2000 file in the middle of JPEG2000 decoding executed by the JPEG2000 decoder;

wherein, when the choice to read the XML data is selected through the selector, the XML data is read.

5. The JPEG2000 decoding method of claim 2, further comprising allowing a user to select, using a selector, whether to read XML data stored in an XML box added into a bit stream constructing said JPEG2000 file in the middle of JPEG2000 decoding executed by the JPEG2000 decoder;

wherein, when the choice to read the XML data is selected through the selector, the XML data is read.

6. A JPEG2000 coding apparatus for generating JPEG2000 file comprising:
- a JPEG2000 coder which codes image data to convert it to JPEG2000 file;
- an area discriminator which discriminates an area defined by each object contained in said image data and specifies type of the object;
- an XML data producer which performs character recognition processing on the area discriminated as that containing a character by said area discriminator to produce text data and produces an XML data corresponding to said text data; and
- an XML box adder which positions an XML box that has stored said XML data produced by said XML data producer into a bit stream constructing said JPEG2000 file in back of data corresponding to a predetermined resolution and in front of data corresponding to a higher resolution than said predetermined resolution.

7. A JPEG2000 decoding apparatus for receiving and decoding a JPEG2000 file produced by said JPEG2000 coding apparatus described in claim 6, the JPEG2000 decoding apparatus comprising:
- a JPEG2000 decoder which decodes said JPEG2000 file to convert it to an image data;
- a reader which reads XML data stored in an XML box added into a bit stream constructing said JPEG2000 file in the middle of JPEG2000 decoding executed by the JPEG2000 decoder; and
- an XML data processor which, when the XML data has been read by said reader, processes the XML data stored in the XML box to acquire text data.

8. The JPEG2000 decoding apparatus of claim 7, further comprising a display for displaying the text data acquired by said XML data processor in the middle of JPEG2000 decoding executed by the JPEG2000 decoder.

9. The JPEG2000 decoding apparatus of claim 8, further comprising a selector configured to allow a user to select whether to read XML data stored in an XML box added into a bit stream constructing said JPEG2000 file in the middle of JPEG2000 decoding executed by the JPEG2000 decoder;

wherein, when the choice to read the XML data is selected through the selector, the XML data is to be read by the reader.

10. The JPEG2000 decoding apparatus of claim 7, further comprising a selector configured to allow a user to select whether to read XML data stored in an XML box added into a bit stream constructing said JPEG2000 file in the middle of JPEG2000 decoding executed by the JPEG2000 decoder;

wherein, when the choice to read the XML data is selected through the selector, the XML data is to be read by the reader.

* * * * *

UNITED STATES PATENT AND TRADEMARK OFFICE
CERTIFICATE OF CORRECTION

PATENT NO.         : 7,483,582 B2
APPLICATION NO.    : 10/807390
DATED              : January 27, 2009
INVENTOR(S)        : Kaitaku Ozawa et al.

It is certified that error appears in the above-identified patent and that said Letters Patent is hereby corrected as shown below:

Claim 6, Column 11, Line 20: delete "an" should read, "text data and produces XML data corresponding to ..."

Signed and Sealed this

Twenty-first Day of April, 2009

JOHN DOLL
*Acting Director of the United States Patent and Trademark Office*